(12) United States Patent
Liu

(10) Patent No.: US 10,453,072 B2
(45) Date of Patent: Oct. 22, 2019

(54) ELECTRONIC DEVICE HAVING DISASSEMBLE MONITORING DEVICE

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Cheng-Xiang Liu, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/884,404

(22) Filed: Jan. 31, 2018

(65) Prior Publication Data

US 2019/0188727 A1    Jun. 20, 2019

(30) Foreign Application Priority Data

Dec. 15, 2017    (CN) .......................... 2017 1 1354220

(51) Int. Cl.
   *G06K 19/00*    (2006.01)
   *G06Q 30/00*    (2012.01)
   *G06F 21/86*    (2013.01)
   *G06K 19/07*    (2006.01)

(52) U.S. Cl.
   CPC .......... *G06Q 30/012* (2013.01); *G06F 21/86* (2013.01); *G06Q 30/018* (2013.01); *G06K 19/0701* (2013.01); *G06K 19/0717* (2013.01)

(58) Field of Classification Search
   USPC ....... 235/375–377, 385, 435, 439, 454, 487, 235/492
   See application file for complete search history.

(56) References Cited

U.S. PATENT DOCUMENTS

2010/0313056 A1*  12/2010  Margolis ................. G06F 1/263
                                                    713/500

\* cited by examiner

*Primary Examiner* — Matthew Mikels
(74) *Attorney, Agent, or Firm* — ScienBiziP, P.C.

(57) ABSTRACT

A disassemble monitoring device of an electronic device includes a detecting unit, a one time programmable register, a storage, and a processor. The detecting unit is configured to detect whether the electronic device has been disassembled, and upon detecting that the electronic device has been disassembled, generate a detection signal. The one time programmable register is electrically coupled to the detecting unit and is configured to change a storage value of the one time programmable register in response to the detection signal. The storage value can only be changed once. The processor retrieves the storage value from the one time programmable register in response to a user operation and determines whether the storage value has been changed. Upon determining that the storage value has been changed, the processor confirms a result of determination that the electronic device has been disassembled and outputs the result of determination.

18 Claims, 4 Drawing Sheets

ELECTRONIC DEVICE HAVING DISASSEMBLE MONITORING DEVICE

CROSS-REFERENCE TO RELATED APPLICATIONS

This application claims priority to Chinese Patent Application No. 201711354220.4 filed on Dec. 15, 2017.

FIELD

The subject matter herein generally relates to an electronic device, and more particularly to an electronic device having a disassemble monitoring device.

BACKGROUND

Generally, new electronic devices include a warranty when bought. If the electronic device is brought in to be repaired, it is important to determine whether the warranty is still valid according to whether the electronic device has been changed or modified.

BRIEF DESCRIPTION OF THE DRAWINGS

Implementations of the present disclosure will now be described, by way of example only, with reference to the attached figures.

DETAILED DESCRIPTION

Figure 1:
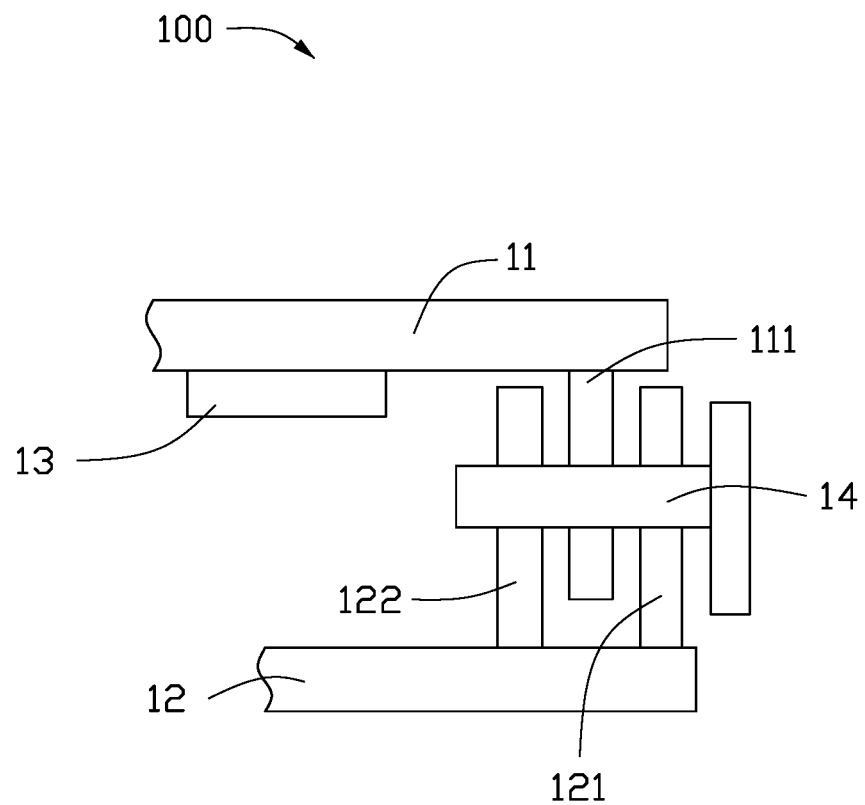
FIG. 1 is a diagram of an exemplary embodiment of a disassemble monitoring device of an electronic device in accordance with an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected.

In general, the word "module" as used hereinafter refers to logic embodied in hardware or firmware, or to a collection of software instructions, written in a programming language such as, for example, Java, C, or assembly. One or more software instructions in the modules may be embedded in firmware such as in an erasable-programmable read-only memory (EPROM). It will be appreciated that the modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

FIG. 1 illustrates an embodiment of an electronic device 100. The electronic device 100 includes a display 11, a back cover 12, and a motherboard 13. The back cover 12 is snapped on the display 11. The motherboard 13 is between the back cover 12 and the display 11. The display 11 and the back cover 12 are coupled together by at least one screw 14. In at least one embodiment, the display 11 and the back cover 12 are coupled together at one end by a snapping mechanism (not shown), and coupled together at another end by the screw 14. The display 11 includes a snap 111 protruding from the display 11. The back cover 12 includes a first locking mechanism 121 and a second locking mechanism 122 protruding from the back cover 12. The first locking mechanism 121 and the second locking mechanism 122 are spaced apart. When the back cover 12 is snapped to the display 11, the snap 111 is between the first locking mechanism 121 and the second locking mechanism 122. The screw 14 passes through the first locking mechanism 121, the snap 111, and the second locking mechanism 122 in sequence to lock the back cover 12 to the display 11. The electronic device 100 can be a mobile phone, a tablet computer, a personal digital assistant, a smart bracelet, a smart watch, smart glasses, or any portable or wearable electronic device. The electronic device 100 can further include a circuit system, a sound system, an input/output port, a battery, an operating system, and the like.

Figure 2:
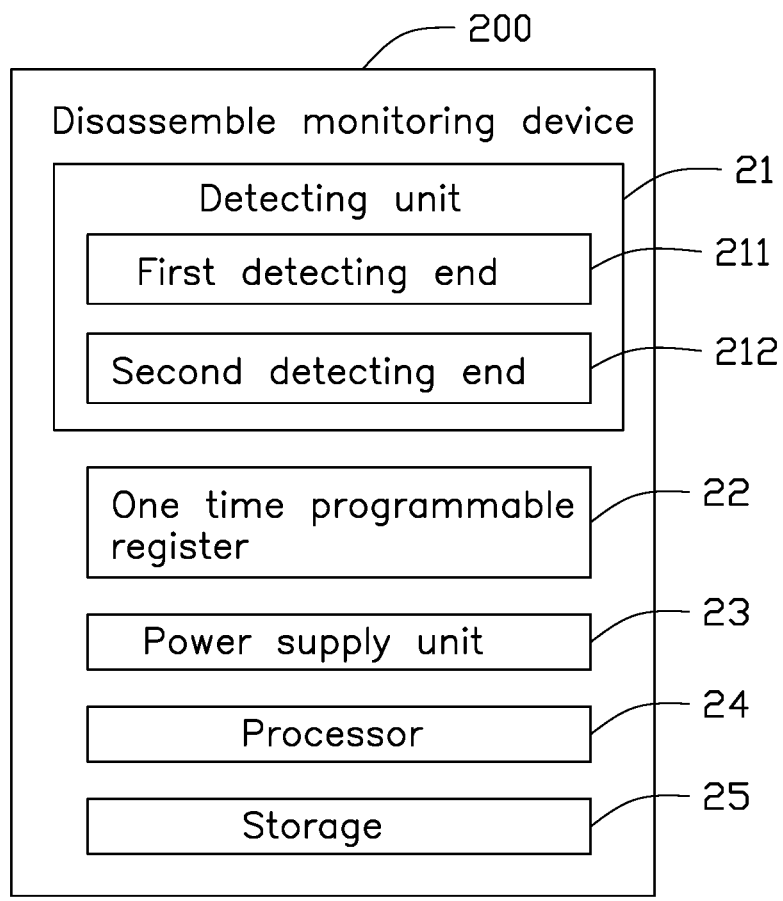
FIG. 2 is a block diagram of the disassemble monitoring device of FIG. 1.

FIG. 2 illustrates an embodiment of a disassemble monitoring device 200 of the electronic device 100. The disassemble monitoring device 200 is used for detecting whether the electronic device 100 is disassembled.

The disassemble monitoring device 200 includes a detecting unit 21, a one time programmable register 22, a power supply unit 23, a processor 24, and a storage 25.

The detecting unit 21 detects whether the electronic device 100 has been disassembled, and upon detecting that the electronic device 100 has been disassembled, generates a detection signal and sends the detection signal to the one time programmable register 22.

In at least one embodiment, the detecting unit 21 detects that the electronic device 100 has been disassembled when the screw 14 has been removed to unlock the display 11 and the back cover 12. When the detecting unit 21 detects that the screw 14 has been removed, the detecting unit 21 generates the detection signal and sends the detection signal to the one time programmable register 22.

The detecting unit 21 includes a first detecting end 211 and a second detecting end 212. The first detecting end 211 is arranged on the first locking mechanism 121, and the second detecting end 212 is arranged on the second locking mechanism 122. The first detecting end 211 and the second detecting end 212 are electrically conductive. The first detecting end 211 is grounded, and the second detecting end 212 is at a high voltage level and electrically coupled to a pull-up resistor (not shown). When the screw 14 couples the first detecting end 211 and the second detecting end 212, because the screw 14 is made of an electrically conductive material such as metal and passes through the first detecting end 211 and the second detecting end 212, the second detecting end 212 is grounded and outputs a low-level voltage. When the screw 14 is removed, the second detecting end 212 is not electrically coupled to the first detecting end 211 and outputs a high-level voltage. The high-level voltage is the detection signal. The second detecting end 212 is electrically coupled to the one time programmable register 22 and sends the detection signal to the one time programmable register 22.

In at least one embodiment, the detecting unit 21 also detects whether the electronic device 100 has been disassembled by detecting that the snap 111 has been removed from between the first locking mechanism 121 and the second locking mechanism 122. The detecting unit 21 includes an infrared emitter and an infrared receiver. The infrared emitter is arranged on the first locking mechanism 121, and the infrared receiver is arranged on the second locking mechanism 122. When the electronic device 100 has not been disassembled, because the snap 111 is between the first locking mechanism 121 and the second locking mechanism 122, the infrared receiver cannot receive infrared signals from the infrared emitter. When the electronic device 100 has been disassembled, the snap 111 is removed from between the first locking mechanism 121 and the second locking mechanism 122, so that the infrared receiver can receive infrared signals from the infrared emitter. When the infrared receiver receives infrared signals from the infrared emitter, the detecting unit 21 detects that the electronic device 100 has been disassembled, generates the detection signal, and sends the detection signal to the one time programmable register 22.

In at least one embodiment, the detecting unit 21 is a pressure sensor arranged between the display 11 and the back cover 12. When the electronic device 100 has not been disassembled, the display 11 and the back cover 12 are assembled together, and the pressure sensor detects a pressure between the display 11 and the back cover 12. When the pressure sensor detects that the pressure has decreased, the detecting unit 21 detects that the display 11 and the back cover 12 have been separated, which means that the electronic device 100 has been disassembled. Thus, the detecting unit 21 generates the detection signal.

In at least one embodiment, the detecting unit 21 is a distance sensor arranged between the display 11 and the back cover 12 and detects whether a distance between the display 11 and the back cover 12 is greater than a predefined distance. When the detecting unit 21 detects that the distance is greater than the predefined distance, the detecting unit 21 detects that the electronic device 100 has been disassembled and generates the detection signal.

After the one time programmable register 22 receives the detection signal, the one time programmable register 22 changes a storage value thereof. When the one time programmable register 22 is manufactured, a default storage value of the one time programmable register 22 is set as 0. When the one time programmable register 22 receives the detection signal, the one time programmable register 22 changes the storage value to 1. The storage value can be changed only once. Thus, the one time programmable register 22 can effectively record that the electronic device 100 has been disassembled. The storage value cannot be changed or deleted by a user of the electronic device 100.

In at least one embodiment, the one time programmable register 22 is uniquely paired to the electronic device 100 to function. In detail, the one time programmable register 22 is paired to the motherboard 13. The one time programmable register 22 includes a unique physical address. A recognition port of a system on a chip of the motherboard 13 recognizes the physical address of the one time programmable register 22 to pair the one time programmable register 22 to the motherboard 13. Thus, the one time programmable register 22 is prevented from being replaced, and an efficiency of detecting whether the electronic device 100 has been disassembled is increased.

The power supply unit 23 is electrically coupled to the one time programmable register 22 to provide power for the one time programmable register 22. In at least one embodiment, the power supply unit 23 is a designated battery of the one time programmable register 22. In at least one embodiment, the power supply unit 23 is a designated battery of the one time programmable register 22 and also electrically coupled to a battery of the electronic device 100, so that the power supply unit 23 is charged by the battery of the electronic device 100 when a power level of the power supply unit 23 is below a predefined power level. In at least one embodiment, the power supply unit 23 is the battery of the electronic device 100.

In at least one embodiment, the one time programmable register 22 includes two data output ports. A first data output port is electrically coupled to the processor 24. A second data output port is an external port for coupling to an external device. If the electronic device 100 cannot be powered on, the second data output port is coupled to an external device, and the external device obtains the storage value of the one time programmable register 22.

The processor 24 can be a central processing unit, a microprocessing unit, or any data processing chip.

The storage 25 can be a read-only memory, random access memory, or an external storage device such as a magnetic disk, a hard disk, a smart media card, a secure digital card, a flash card, or the like.

Figure 3:
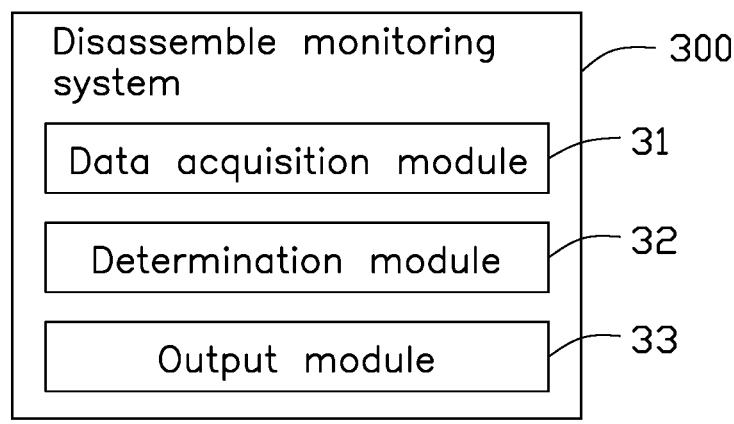
FIG. 3 is a function module diagram of a disassemble monitoring system implemented in the electronic device.

FIG. 3 illustrates an embodiment of a disassemble monitoring system 300. The storage 25 can store the disassemble monitoring system 300, and the disassemble monitoring system 300 can be executed by the processor 24. In another embodiment, the disassemble monitoring system 300 can be embedded in the processor 24. the disassemble monitoring system 300 can be divided into a plurality of modules, which can include one or more software programs in the form of computerized codes stored in the storage 25. The computerized codes can include instructions executed by the processor 24 to provide functions for the modules. The modules can include a data acquisition module 31, a determination module 32, and an output module 33.

The data acquisition module 31 retrieves the storage value from the one time programmable register 22 in response to a user operation. In at least one embodiment, the data acquisition module 31 can retrieve the storage value only when the electronic device 100 is powered on. The user operation can be input through a keyboard, a touch screen, or the like.

The determination module 32 determines whether the storage value has been changed, and upon determining that the storage value has been changed, confirms that the electronic device has been disassembled. When the one time programmable register 22 is manufactured, a default storage value of the one time programmable register 22 is set as 0. The storage 25 stores the default storage value. The determination module 32 compares the obtained storage value to the default storage value stored in the storage 25. When the default storage value matches the obtained storage value, the determination module 32 determines that the storage value has not been changed. When the default storage value does not match the obtained storage value, the determination module 32 determines that the storage value has been changed, and thus determines that the electronic device 100 has been disassembled.

The output module 33 outputs a result of determination for a user. For example, the output module 33 outputs the result of determination on the display 11. When the result of determination is that the electronic device 100 has been disassembled, the display 11 can display a notification window with text saying, "this electronic device has been disassembled." In another embodiment, the output module 33 outputs the result of comparison through a speaker (not shown) or other output device.

In at least one embodiment, before obtaining the storage value from the one time programmable register 22, the determination module 32 first determines whether the one time programmable register 22 is uniquely paired to the motherboard 13. If the one time programmable register 22 is uniquely paired to the motherboard 13, the storage value is obtained. If the one time programmable register 22 is not uniquely paired to the motherboard 13, the output module 33 outputs a notification to inform a user that the one time programmable register 22 is not uniquely paired to the motherboard 13. In detail, the determination module 32 determines whether the physical address of the one time programmable register 22 matches a preset physical address. If the physical address of the one time programmable register 22 matches the preset physical address, the determination module 32 determines that the one time programmable register 22 is uniquely paired to the motherboard 13. If the physical address of the one time programmable register 22 does not match the preset physical address, the determination module 32 determines that the one time programmable register 22 is not uniquely paired to the motherboard 13, and a manufacturer or repairman can determine that the electronic device 100 is not under warranty or is not an original device.

In at least one embodiment, before obtaining the storage value from the one time programmable register 22, the determination module 32 first determines whether an operating system of the electronic device 100 is authentic. If the operating system is authentic, the determination module 32 obtains the storage value. If the operating system is not authentic, the output module 33 outputs a notification to inform a user that the operating system is not authentic, and a manufacturer or repairman can determine that the electronic device 100 is not under warranty or is not an original device.

Figure 4:
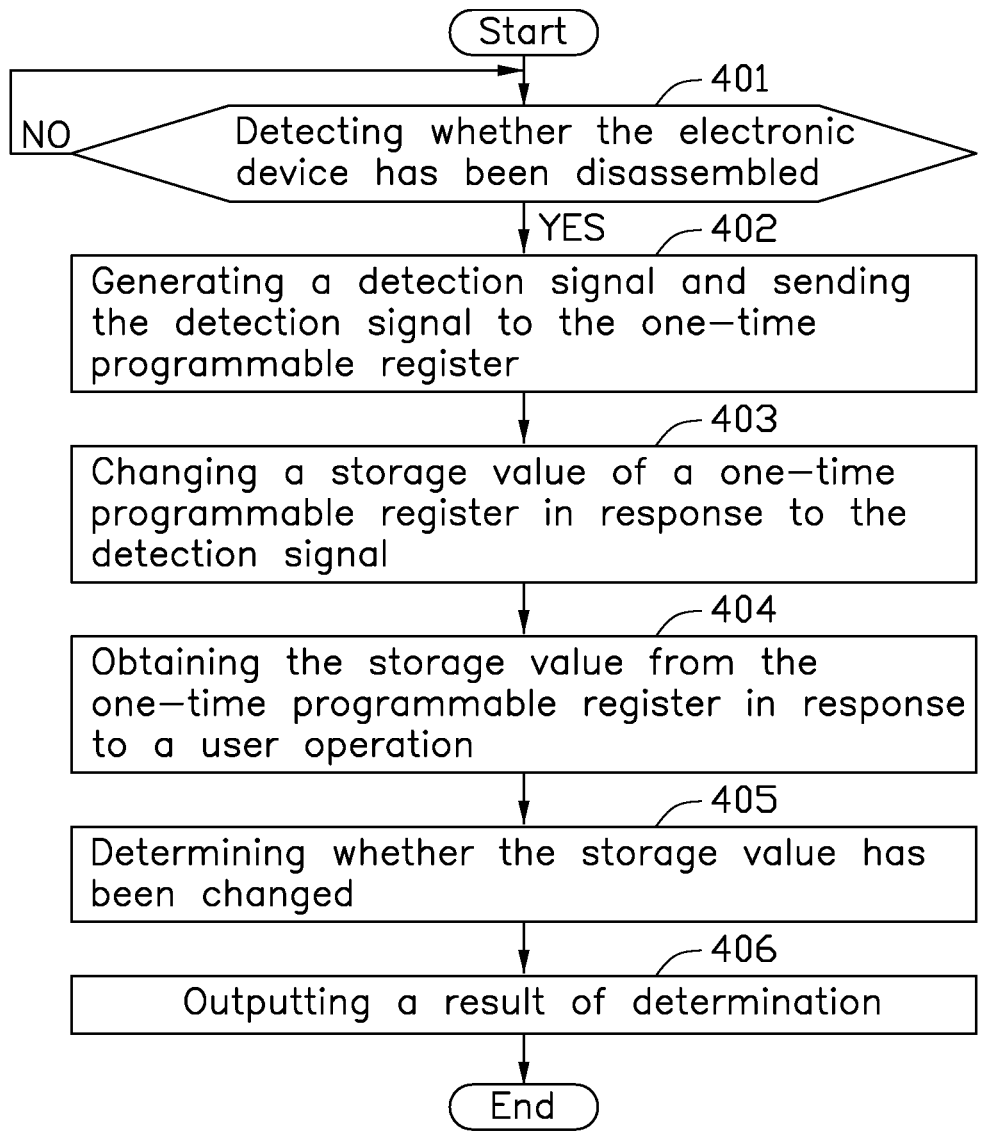
FIG. 4 is a flow chart of a method for determining whether an electronic device has been disassembled.

FIG. 4 illustrates a flowchart of an exemplary method for determining whether an electronic device has been disassembled. The example method is provided by way of example, as there are a variety of ways to carry out the method. The method described below can be carried out using the configurations illustrated in FIGS. 1-3, for example, and various elements of these figures are referenced in explaining the example method. Each block shown in FIG. 4 represents one or more processes, methods, or subroutines carried out in the example method. Furthermore, the illustrated order of blocks is by example only, and the order of the blocks can be changed. Additional blocks can be added or fewer blocks can be utilized, without departing from this disclosure. The example method can begin at block 401.

At block 401, the detecting unit 21 detects whether the electronic device 100 has been disassembled. If the detecting unit 21 detects that the electronic device 100 has been disassembled, block 402 is implemented. If the detecting unit 21 detects that the electronic device 100 has not been disassembled, block 401 is repeated.

At block 402, the detecting unit 21 generates a detection signal and sends the detection signal to the one time programmable register 22.

At block 403, the one time programmable register 22 changes a storage value thereof in response to the detection signal.

At block 404, the data acquisition module 31 obtains the storage value from the one time programmable register in response to a user operation.

At block 405, the determination module 32 determines whether the storage value has been changed.

At block 406, the output module 33 outputs a result of determination.

In at least one embodiment, before obtaining the storage value from the one time programmable register 22, the determination module 32 first determines whether the one time programmable register 22 is uniquely paired to the motherboard 13. If the one time programmable register 22 is uniquely paired to the motherboard 13, the storage value is obtained. If the one time programmable register 22 is not uniquely paired to the motherboard 13, the output module 33 outputs a notification to inform a user that the one time programmable register 22 is not uniquely paired to the motherboard 13. In detail, the determination module 32 determines whether the physical address of the one time programmable register 22 matches a preset physical address. If the physical address of the one time programmable register 22 matches the preset physical address, the determination module 32 determines that the one time programmable register 22 is uniquely paired to the motherboard 13. If the physical address of the one time programmable register 22 does not match the preset physical address, the determination module 32 determines that the one time programmable register 22 is not uniquely paired to the motherboard 13, and a manufacturer or repairman can determine that the electronic device 100 is not under warranty or is not an original device.

In at least one embodiment, before obtaining the storage value from the one time programmable register 22, the determination module 32 first determines whether an operating system of the electronic device 100 is authentic. If the operating system is authentic, the determination module 32 obtains the storage value. If the operating system is not authentic, the output module 33 outputs a notification to inform a user that the operating system is not authentic, and a manufacturer or repairman can determine that the electronic device 100 is not under warranty or is not an original device.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A disassemble monitoring device comprising:
a detecting unit configured to detect whether an electronic device has been disassembled, and upon detecting that the electronic device has been disassembled, generate a detection signal, wherein the detecting unit comprises a first detecting end and a second detecting end; the first detecting end is arranged on a first locking mechanism of a back cover of the electronic device, and the second detecting end is arranged on a second locking mechanism of the back cover of the electronic device; when the first detecting end and the second detecting end are coupled by an electrically conductive screw passing through the first locking mechanism, a snap protruding from a display of the electronic device, and the second locking mechanism, the detecting unit outputs a first signal; when the screw is removed and the first detecting end and the second detecting end are not coupled together, the detecting unit outputs a second signal; the second signal is the detection signal which is sent to a one-time programmable register;

the one-time programmable register is electrically coupled to the detecting unit and configured to change a storage value of the one-time programmable register in response to the detection signal, the storage value being changeable only once;

a storage; and a processor configured to execute a plurality of instructions that cause the processor to:

retrieve the storage value from the one-time programmable register in response to a user operation;

determine whether the storage value has been changed, and upon determining that the storage value has been changed, confirm that the electronic device has been disassembled; and output the result of determination.

2. The disassemble monitoring device of claim 1, wherein the first detecting end and the second detecting end are electrically conductive; the first detecting end is grounded; the second detecting end is at a high voltage level and electrically coupled to a pull-up resistor; when the screw couples the first detecting end and the second detecting end; the second detecting end outputs a low-level voltage; when the screw is removed, the second detecting end outputs a high-level voltage.

3. The disassemble monitoring device of claim 1, wherein the one-time programmable register is uniquely paired to the electronic device and only functions in the uniquely paired state.

4. The disassemble monitoring device of claim 3, wherein before the processor obtains the storage value from the one-time programmable register, the processor first determines whether the one-time programmable register is uniquely paired to the electronic device; the processor obtains the storage value when the one-time programmable register is uniquely paired to the electronic device; when the one-time programmable register is not uniquely paired to the electronic device, the processor outputs a notification to a user that the one-time programmable register is not uniquely paired to the electronic device.

5. The disassemble monitoring device of claim 1, further comprising a power supply unit configured to provide power for the one-time programmable register.

6. The disassemble monitoring device of claim 1, wherein the one-time programmable register comprises two data ports; a first data port is in communication with the processor to provide the storage value from the one-time programmable register to the processor; a second data port is configured to provide the storage value to an external device.

7. An electronic device comprising:

a display comprising a snap protruding from the display;

a back cover comprising a first locking mechanism and a second locking mechanism spaced apart;

at least one screw which is made of an electrically conductive material; and a disassemble monitoring device;

wherein the snap is snapped between the first locking mechanism and the second locking mechanism, the at least one screw is passed through the first locking mechanism, the snap, and the second locking mechanism in sequence;

wherein the disassemble monitoring device comprises:

a detecting unit configured to detect whether the electronic device has been disassembled, and upon detecting that the electronic device has been disassembled, generate a detection signal; and a one-time programmable register coupled to the detecting unit and configured to change a storage value of the one-time programmable register in response to the detection signal, the storage value being changeable only once;

the detecting unit comprises a first detecting end and a second detecting end, the first detecting end is arranged on the first locking mechanism, and the second detecting end is arranged on the second locking mechanism, the screw passes through the first detecting end and the second detecting end to electrically couple the first detecting end to the second detecting end; when the first detecting end and the second detecting end are coupled by the screw, the detecting unit outputs a first signal; when the screw is removed and the first detecting end and the second detecting end are not coupled together, the detecting unit outputs a second signal; the second signal is the detection signal and is sent to the one-time programmable register;

a storage; and a processor configured to execute a plurality of instructions that cause the processor to:

retrieve the storage value from the one-time programmable register in response to a user operation;

determine whether the storage value has been changed, and upon determining that the storage value has been changed, confirm that the electronic device has been disassembled; and output the result of determination.

8. The electronic device of claim 7, wherein the disassemble monitoring device further comprises a processor configured to execute a plurality of instructions that cause the processor to:

retrieve the storage value from the one-time programmable register in response to a user operation;

determine whether the storage value has been changed, and upon determining that the storage value has been changed, confirming a result of determination that the electronic device has been disassembled; and output the result of determination.

9. The electronic device of claim 8, wherein the first detecting end and the second detecting end are electrically conductive; the first detecting end is grounded; the second detecting end is at a high voltage level and electrically coupled to a pull-up resistor; when the screw couples the first detecting end and the second detecting end; the second detecting end outputs a low-level voltage; when the screw is removed, the second detecting end outputs a high-level voltage.

10. The electronic device of claim 9, wherein the one-time programmable register is uniquely paired to the electronic device and only functions in the uniquely paired state.

11. The electronic device of claim 10, wherein before the processor obtains the storage value from the one-time programmable register, the processor first determines whether the one-time programmable register is uniquely paired to the electronic device; the processor obtains the storage value when the one-time programmable register is uniquely paired to the electronic device; when the one-time programmable register is not uniquely paired to the electronic device, the processor outputs a notification to a user that the one-time programmable register is not uniquely paired to the electronic device.

12. The electronic device of claim 11, wherein the disassemble monitoring device further comprise a power supply unit configured to provide power for the one-time programmable register.

13. The electronic device of claim 12, wherein the one-time programmable register comprises two data ports; a first data port is in communication with the processor to provide the storage value from the one-time programmable register to the processor; a second data port is configured to provide the storage value to an external device.

14. A method for determining whether an electronic device has been disassembled, the electronic device comprising a disassemble monitoring device comprising a detecting unit and a one-time programmable register, the method comprising:
  detecting, through the detecting unit, whether the electronic device has been disassembled, wherein the electronic device comprises a display, a back cover, and an electrically conductive screw; the display comprises a snap protruding from the display; the back cover comprises a first locking mechanism and a second locking mechanism spaced apart and corresponding to each other; the snap is snapped between the first locking mechanism and the second locking mechanism; the screw is passed through the first locking mechanism, the snap, and the second locking mechanism in sequence; the detecting unit comprises a first detecting end and a second detecting end; the first detecting end is arranged on the first locking mechanism, and the second detecting end is arranged on the second locking mechanism; the screw passes through the first detecting end and the second detecting end to electrically couple the first detecting end to the second detecting end; when the first detecting end and the second detecting end are coupled by the screw, the detecting unit outputs a first signal; when the screw is removed and the first detecting end and the second detecting end are not coupled together, the detecting unit outputs a second signal; the second signal being the detection signal which is sent to the one-time programmable register;
  upon detecting that the electronic device has been disassembled, generating a detection signal and sending the detection signal to a one-time programmable register;
  changing a storage value of the one-time programmable register in response to the detection signal;
  retrieving the storage value from the one-time programmable register in response to a user operation;
  determining whether the storage value has been changed, and upon determining that the storage value has been changed, confirming that the electronic device has been disassembled; and
  outputting the result of determination.

15. The method of claim 14, wherein the first detecting end and the second detecting end are electrically conductive; the first detecting end is grounded; the second detecting end is at a high voltage level and electrically coupled to a pull-up resistor; when the screw couples the first detecting end and the second detecting end; the second detecting end outputs a low-level voltage; when the screw is removed, the second detecting end outputs a high-level voltage.

16. The method of claim 15, wherein the one-time programmable register is uniquely paired to the electronic device and only functions in the uniquely paired state.

17. The method of claim 16, wherein before the processor obtains the storage value from the one-time programmable register, the processor first determines whether the one-time programmable register is uniquely paired to the electronic device; the processor obtains the storage value when the one-time programmable register is uniquely paired to the electronic device; when the one-time programmable register is not uniquely paired to the electronic device, the processor outputs a notification to a user that the one-time programmable register is not uniquely paired to the electronic device.

18. The method of claim 17, wherein the disassemble monitoring device further comprises a power supply unit configured to provide power for the one-time programmable register.

* * * * *